(12) United States Patent
Steiner et al.

(10) Patent No.: US 8,504,682 B2
(45) Date of Patent: Aug. 6, 2013

(54) LOCALIZATION OF PEER TO PEER TRAFFIC

(75) Inventors: Moritz M. Steiner, Red Bank, NJ (US);
Ivica Rimac, Tinton Falls, NJ (US); Hilt Volker, Middletown, NJ (US)

(73) Assignee: Alcatel Lucent, Paris (FR)

( * ) Notice: Subject to any disclaimer, the term of this patent is extended or adjusted under 35 U.S.C. 154(b) by 329 days.

(21) Appl. No.: 12/640,833

(22) Filed: Dec. 17, 2009

(65) Prior Publication Data
US 2011/0153802 A1  Jun. 23, 2011

(51) Int. Cl.
*G06F 15/173* (2006.01)

(52) U.S. Cl.
USPC .......................................... 709/224; 709/704

(58) Field of Classification Search
USPC .......................................................... 709/224
See application file for complete search history.

(56) References Cited

U.S. PATENT DOCUMENTS

| | | | |
|---|---|---|---|
| 2007/0064702 A1* | 3/2007 | Bates et al. | 370/392 |
| 2008/0140780 A1* | 6/2008 | Hopkins et al. | 709/205 |
| 2008/0219169 A1 | 9/2008 | Sargor et al. | |
| 2009/0083414 A1* | 3/2009 | Lazovsky et al. | 709/224 |
| 2009/0265458 A1* | 10/2009 | Baker et al. | 709/224 |
| 2011/0055392 A1* | 3/2011 | Shen et al. | 709/225 |
| 2011/0282945 A1* | 11/2011 | Thyni et al. | 709/204 |

FOREIGN PATENT DOCUMENTS

| EP | 2 086 206 | 8/2009 |
|---|---|---|
| EP | 2086206 A1 * | 8/2009 |

OTHER PUBLICATIONS

Vinay Aggarwal et al., "Can ISPs and P2P Users Cooperate for Improved Performance?" ACM SIGCOMM Computer Communcation Review, vol. 37, No. 3, Jul. 2007, pp. 31-40.
International Search Report dated Feb. 10, 2011 for corresponding International Application No. PCT/US2010/058492.
Penno et al., "ALTO Protocol draft-penno-alto-protocol-04.txt", Oct. 26, 2009, pp. 1-36.
International Search Report dated Jun. 28, 2012, for corresponding International Application No. PCT/US2010/058492.
Petar Maymounkov et al., "Kademlia: A Peer-to-peer Information System Based on the XOR Metric" IPTPS, 2002, pp. 1-6.
Frank Dabek et al., "Vivaldi: A Decentralized Network Coordinate System" ACM SIGCOMM '04, Aug. 30-Sep. 3, 2004, Portland, OR, pp. 15-26.
Jonathan Ledlie et al., "Network Coordinates in the Wild" NSDI '07: $4^{TH}$ USENIX Symposium on Networked Sysems Design & Implementation, 2007, pp. 299-312.
Moritz Steiner et al., "Where Is My Peer? Evaluation of the Vivaldi Network Coordinate System in Azureus" Networking, 2009, pp. 145-156.
David Choffnes et al., "Taming the Torrent: A Practical Approach to Reducing Cross-ISP Traffic in Peer-to-Peer Systems" ACM SIGCOMM '08, Aug. 17-22, 2008, Seattle, Washington, pp. 363-374.

(Continued)

*Primary Examiner* — Tauqir Hussain
(74) *Attorney, Agent, or Firm* — Harness, Dickey & Pierce

(57) ABSTRACT

A method of processing peer-to-peer requests is provided. The method may include; storing, at a network element, peer information in a database for each peer of a plurality of peers, the peer information indicating at least one ISP associated with the peer and the content contained by the peer, receiving a request for content from a requester, and sending a response to the content requester based on the ISP with which the requester is associated and the stored peer information.

19 Claims, 6 Drawing Sheets

(56) References Cited

OTHER PUBLICATIONS

Moritz Steiner, "Structures and Algorithms for Peer-to-Peer Cooperation", Doctoral thesis, Eurecom and University of Manheim, 2008.

Moritz Steiner et al., "Exploiting KAD: Possible Uses and Misuses" Computer Communication Review, 2007, pp. 65-69.

Vinay Aggarwal et al., "Can ISPs and P2P Users Cooperate for Improved Performance?" ACM SIGCOMM Computer Communcation Review, vol. 37. No. 3, Jul. 2007, pp. 31-40.

Van Jacobson et al., "Networking Named Content" ACM CoNEXT 2009, Dec. 1-4, 2009, Rome, Italy, pp. 1-12.

Miguel Castro et al., "Pastry: A substrate for peer-to-peer applications" https://research.microsoft.com/en-us/um/people/antr/pastry/, webpage created Feb. 15, 2001.

\* cited by examiner

LOCALIZATION OF PEER TO PEER TRAFFIC

BACKGROUND OF THE INVENTION

1. Field of the Invention

The field of the invention relates to peer-to-peer file sharing networks and a method for localizing peer-to-peer traffic.

2. Description of the Related Art

Some versions of peer-to-peer file sharing networks rely on a centralized computer or network of network elements to list all of the available content in the network. Other peer-to-peer file sharing networks do not rely on centralized components to list all of the available content on a network. Rather, the directory is distributed as the content itself is distributed. The technique used to distribute the directory database on all participating clients is sometimes referred to as a distributed hash table (DHT).

Whether the network is a centralized type network or a network using a DHT, peers download content from one peer to another without regard to the locality of a peer from which content is shared. As a result, if a peer requests a file contained on a another peer's computer, the computer containing the file may be located far away from the peer requesting the file resulting not only in file transfer delays, but increased cost as the link between the peers must go through one or more internet service providers (ISPs). Thus, such peer-to-peer type of connections can create a large amount of traffic on transit links linking ISPs together, thereby increasing costs to network operators.

For example, assume there is a popular content file and that there are 10,000 users world-wide that have this file on their computers. Assume 50 of those 10,000 users may be located within a given ISP "A". Assume a peer within ISP "A" is interested in the popular file and requests the directory, either the centralized or DHT type directory for 50 random peers from which to download the file. In such an instance there is a chance of 0.5% of finding a single peer within ISP "A." There is a chance close to zero that if 50 peers having the file are randomly identified to the requesting peer, that all 50 peers will be inside ISP "A."

In such a scenario, while there are ample amount of peers within the same ISP as the peer requesting the file, the chances are that the peer will end up receiving the file from a peer located outside the requesting peer's ISP. This requires unnecessary traffic on a transit link between ISPs.

SUMMARY OF THE INVENTION

Embodiments of the invention relate to methods and apparatuses for processing peer-to-peer requests.

In one embodiment, the method includes; storing, at a network element, peer information in a database for each peer of a plurality of peers. The peer information indicates at least one ISP associated with the peer and the content contained by the peer. The method further includes receiving a request for content from a requester, and sending a response to the content requester based on the ISP with which the requester is associated and the stored peer information.

Another embodiment includes a computer having a microprocessor, a database operatively connected to the microprocessor, and a connection to the Internet configured to operatively connect the microprocessor and database to the internet. Further, the computer is configured to store peer information in the database for each peer of a plurality of peers. The peer information indicates at least one ISP associated with the peer and the content contained by the peer. The computer is further configured to receive a request for content from a requester, and send a response to the content requester based on the ISP with which the requester is associated and the stored peer information.

Another embodiment includes method of processing peer-to-peer requests including detecting a request for content. The method further includes determining an ISP associated with a requester, determining whether the ISP associated with the requester is an ISP of concern, blocking the request to peers associated with an ISP of concern if the ISP associated with the requester is not an ISP of concern. The method further includes responding to the request by sending information regarding peers having the requested content and that are not associated with an ISP of concern if the ISP associated with the requester is not an ISP of concern.

BRIEF DESCRIPTION OF THE DRAWINGS

The present invention will become more fully understood from the detailed description given below and the accompanying drawings, which are given for purposes of illustration only, and thus do not limit the invention.

DETAILED DESCRIPTION OF EXAMPLE EMBODIMENTS

Figure 1:
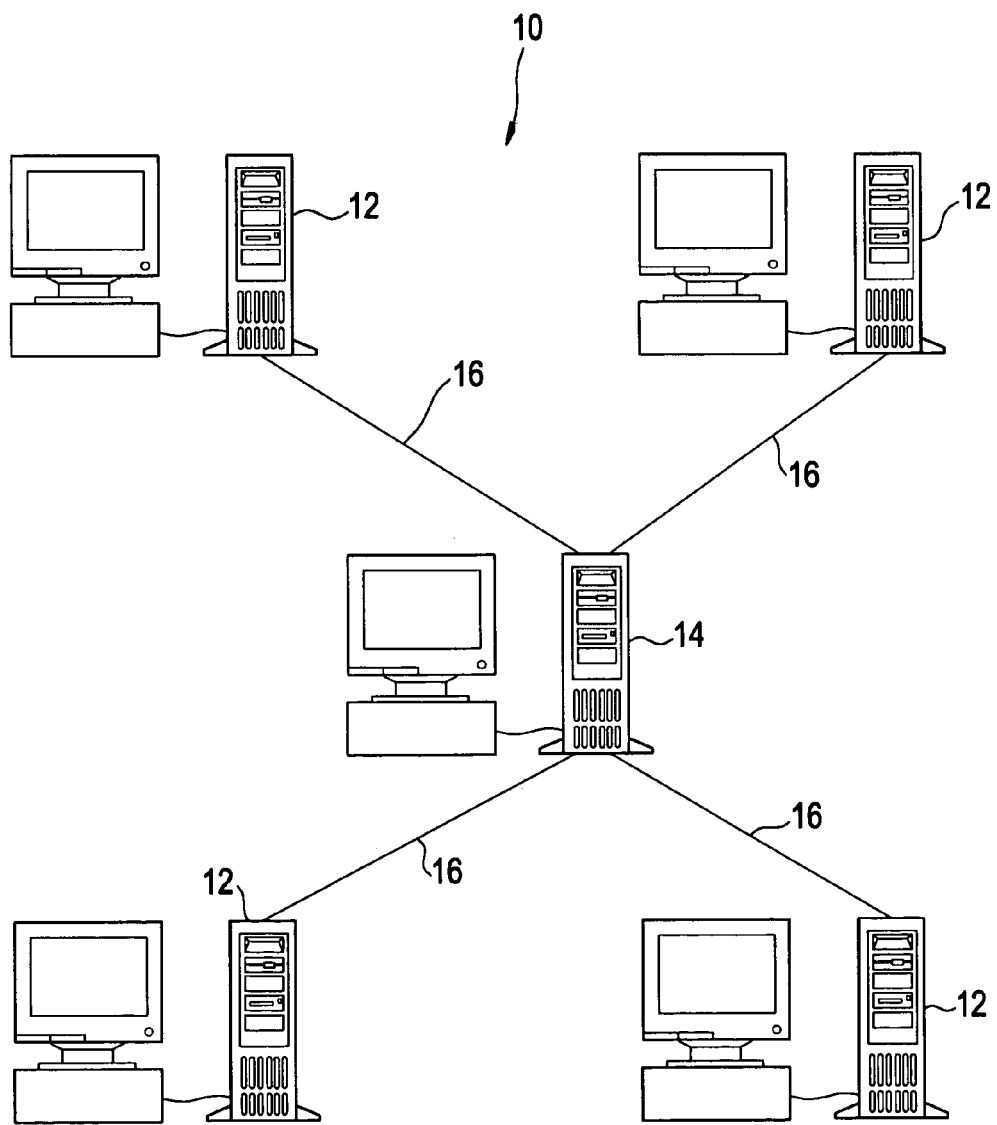
FIG. 1 is schematic diagram of a peer-to-peer file sharing network having centralized components in accordance with an embodiment of the invention.

Various example embodiments will now be described more fully with reference to the accompanying drawings in which some example embodiments are illustrated.

Before discussing example embodiments in more detail, it is noted that some example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed below, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments of the present invention. This invention may, however, be embodied in many alternate forms and should not be construed as limited to only the embodiments set forth herein.

Accordingly, while example embodiments of the invention are capable of various modifications and alternative forms, embodiments thereof are shown by way of example in the drawings and will herein be described in detail. It should be understood, however, that there is no intent to limit example embodiments of the invention to the particular forms disclosed, but on the contrary, example embodiments of the invention are to cover all modifications, equivalents, and alternatives falling within the scope of the invention. As used herein, the term "and/or" includes any and all combinations of one or more of the associated listed items.

The terminology used herein is for the purpose of describing particular embodiments only and is not intended to be limiting of example embodiments of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the present invention and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the following description, illustrative embodiments will be described with reference to acts and symbolic representations of operations (e.g., in the form of flowcharts) that may be implemented as program modules or functional processes include routines, programs, objects, components, data structures, etc., that perform particular tasks or implement particular abstract data types and may be implemented using existing hardware at existing network elements or control nodes (e.g., a scheduler located at a base station or Node B). Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Example embodiments will now be described with like numbers referring to like parts through out.

FIG. 1 shows a schematic diagram of centralized peer-to-peer system 10. The centralized peer-to-peer system 10 includes computers 12 which are also referred to as peers 12 and a central computer 14. The peers 12 are connected to the central computer 14 via connections 16. The connections 16 may be any suitable connection such as wireless connection, internet connection, Ethernet connection or combination of any suitable connection hardware or methods. While several examples have been listed, embodiments in accordance with the invention are not limited to those example listed above.

While the peer-to-peer system 10 shows only four peers 12 and a single central computer 14, it is to be understood that a peer-to-peer system is not limited to the number of peers 12 shown and central network component of a single central computer 14. In fact, the peer-to-peer system 10 may include many more peers 12 and many computers, servers or other components may accomplish the tasks of the central computer 14 shown.

In a centralized peer-to-peer system 10 as shown in FIG. 1, when a peer 12 requests content or a file, the request is sent via the connection 16 to the centralized computer 14. Sending requests are well known in peer-to-peer networks. The sending of the request may be done in accordance with the invention in any suitable manner.

The centralized computer 14 determines what peers 12 have the requested content and may respond to the request with information regarding what peers 12 have the requested content. The centralized computer 14 may identify several peers 12 having the requested content and respond with information regarding multiple identified peers 12. Once a peer 12 or peers 12 is/are identified, the requesting peer may then receive the requested file from one of the identified peers.

In accordance with some embodiments of the invention, the centralized computer 14 may make a determination of which peers 12 among many peers 12 that may contain the requested content that should be identified to the requesting peer in order to reduce large amounts of data being transmitted over transit links. These decisions may be made to localize peer to peer traffic. This determination will be described in more detail later below.

Figure 2:
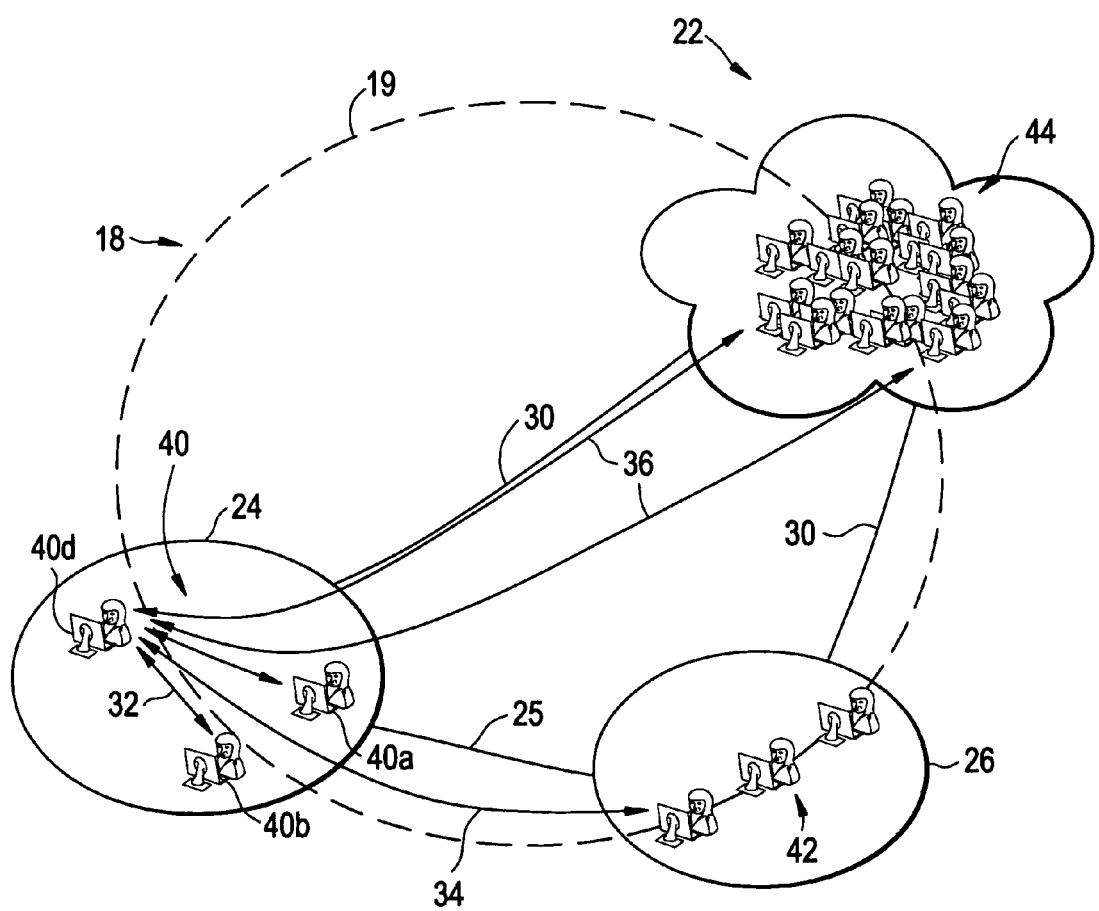
FIG. 2 is a schematic diagram of a peer-to-peer file sharing network utilizing a DHT in accordance with an embodiment of the invention.

FIG. 2 is a schematic diagram a peer-to-peer network 18 in accordance with another embodiment of the invention. In the peer-to-peer network 18 shown in FIG. 2, there is no central computer 14. While not shown, it should be understood that peers 40, are connected by connections to each other.

FIG. 2 shows a peer-to-peer file sharing network 18. The network 18 of FIG. 2 does not rely on centralized components 14 to list the network contents, but rather uses a uses a distributed hash table (DHT) 19 to distribute the directory database to all participating clients. The DHT 19 is represented in FIG. 2 as a broken line connecting all aspects of the network 18 together. The file sharing network 18 includes a first internet service provider (ISP) 24 and a second ISP 26.

Within the ISP 24 are various clients, which may also be referred to as peers or users 40. The various clients, peers or users will be distinguished from amongst other peers on the same ISP by adding a letter behind the reference numeral. A second ISP 26 is also shown having various peers 42. The first ISP 24 and the second ISP 26 may be connected together via a peering link 28. It may be that ISP 24 and ISP 26 communicate with each other often and therefore, the peering link 28 may have a higher capacity or may be able to operate at lower cost than a general transit link, which would link the ISP 24 with an ISP where there is no agreement or special connection. For example, two ISPs may enter into an agreement giving each other preferable treatment and recognizing each other as preferred ISPs. Such an agreement may permit reduced charges associated with peers from each of the ISPs communicating with each other.

The internet at large 22 is illustrated in FIG. 2. ISP 24 may be connected to the internet at large by a transit link 30. A transit link 30 may also connect ISP 26 to the internet at large 22. Peers located on the internet at large 22 are identified by reference number 44. Like the peers 40 and 42, the peers 44 on the internet at large 22 are associated with at least one ISP. However the ISP's associated with the peers 44 on the Internet at large 22 are not shown.

Due to the amount of resources (for example, peering links 28 or transit links 30) needed for sharing files between peers 40, 42, 44 associated with different ISPs 24, 26, it may be preferred, whenever possible, to have peers within a particular ISP share files amongst each other rather than sharing files between peers located on different ISPs.

The arrows 32 illustrate a preferred way of file sharing where the peers 40a, 40b, and 40d share files between each other. All of the peers 40a, 40b, and 40d are located on the ISP 24. There may be some situations that develop where a peer 40 located within an ISP 24 requests a file that is not contained by any peer also located on ISP 24. Therefore, in order to obtain the requested content, the peer 40 must obtain content from a user located either in ISP 26 or the Internet at large 22. ISP 24 and ISP 26 have a peering link 28 connecting them. The peering link 28 may be less expensive to operate and/or there may be an agreement between the operators of ISP 24 and ISP 26. Therefore, it may be desirable to have the peer 40d located on ISP 24 receive content from a peer 42 located on ISP 26 when peer 40d does not receive the content from a peer 40a or 40b on its own ISP 24 as compared to receiving content from a peer 44 located on the internet at large 22. Arrow 34 illustrates the peer 42d receiving content from a peer 42 located on ISP 26.

In a least preferred situation, a peer 40d is requesting content that is not available on any user or peer located in ISP 24 or in ISP 26. Therefore, in order to fill this request for content, the transit link 30 is utilized in order to obtain the content from users 44 located on the internet at large 22. The arrows 36 illustrate this least preferred situation where the peer 40d obtains content via the transit link from the peers 44 on the internet at large 22.

Figure 3:
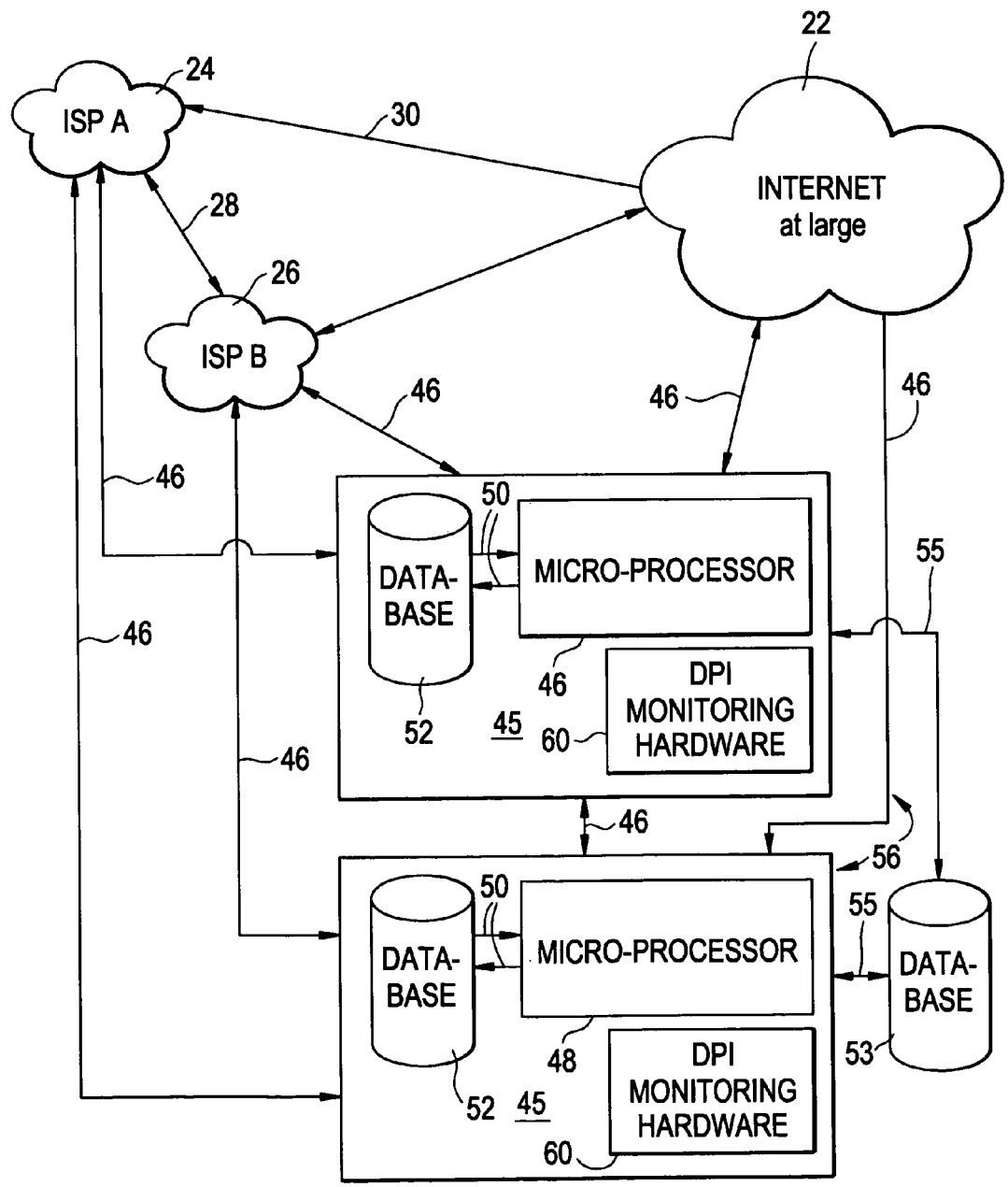
FIG. 3 is a schematic diagram of a file sharing network in accordance with an embodiment of the invention illustrating various components of a computer in communication with the file sharing network.

FIG. 3 is a schematic diagram illustrating various ISPs 24, 26, the internet at large 22, and network components (which may also be referred to as computers, or network elements). The network elements 45 may be part of a centralized component 14 as shown and discussed above with respect to FIG. 1. In other peer-to-peer file sharing networks, such a file sharing network 18 that has no centralized computer 14, but rather uses a DHT 19, the computer or network elements 45 may be distributed throughout the file sharing network. Alternatively, the network elements 45 may be merely connected with the various ISPs 24 and 26, and the internet at large 22 via connections 46.

In some embodiments in accordance with the invention, the network elements 45 are gathered in computer farms at one or various locations. As shown in FIG. 3, the network elements 45 may include one or more micro processors 48 connected via connections 50 to a database 52. In systems configured to monitor peer-to-peer communication through Deep Packet Inspection (DPI), the network elements 45 may include (DPI) hardware 60. The DPI hardware 60 may be any known and available hardware for performing DPI. The network elements 45 may also be operatively connected to another database 53 via connections 55. The database 53 may be searchable and be able provide information to the network elements 45 such as what ISP is associated with a given peer as explained in more detail later below.

In some embodiments of the invention, the network elements 45 may be already existing system components connected to the network. Existing network elements 45 may be programmed to perform the functions described herein. For example, a network 10 having a centralized computer 14 (as shown in FIG. 1) could be programmed to perform the functions described herein. Also other networks 18 that do not use a centralized computer 14 could also have existing network components programmed to perform the function described herein. In other embodiments, the network elements 45 may be added to the network (rather than existing network components) and configured to perform the functions described herein.

Functions and steps performed by various components of the networks in accordance with embodiments of the invention will now be described with reference to the flow charts shown in FIGS. 4 and 5.

Figure 4:
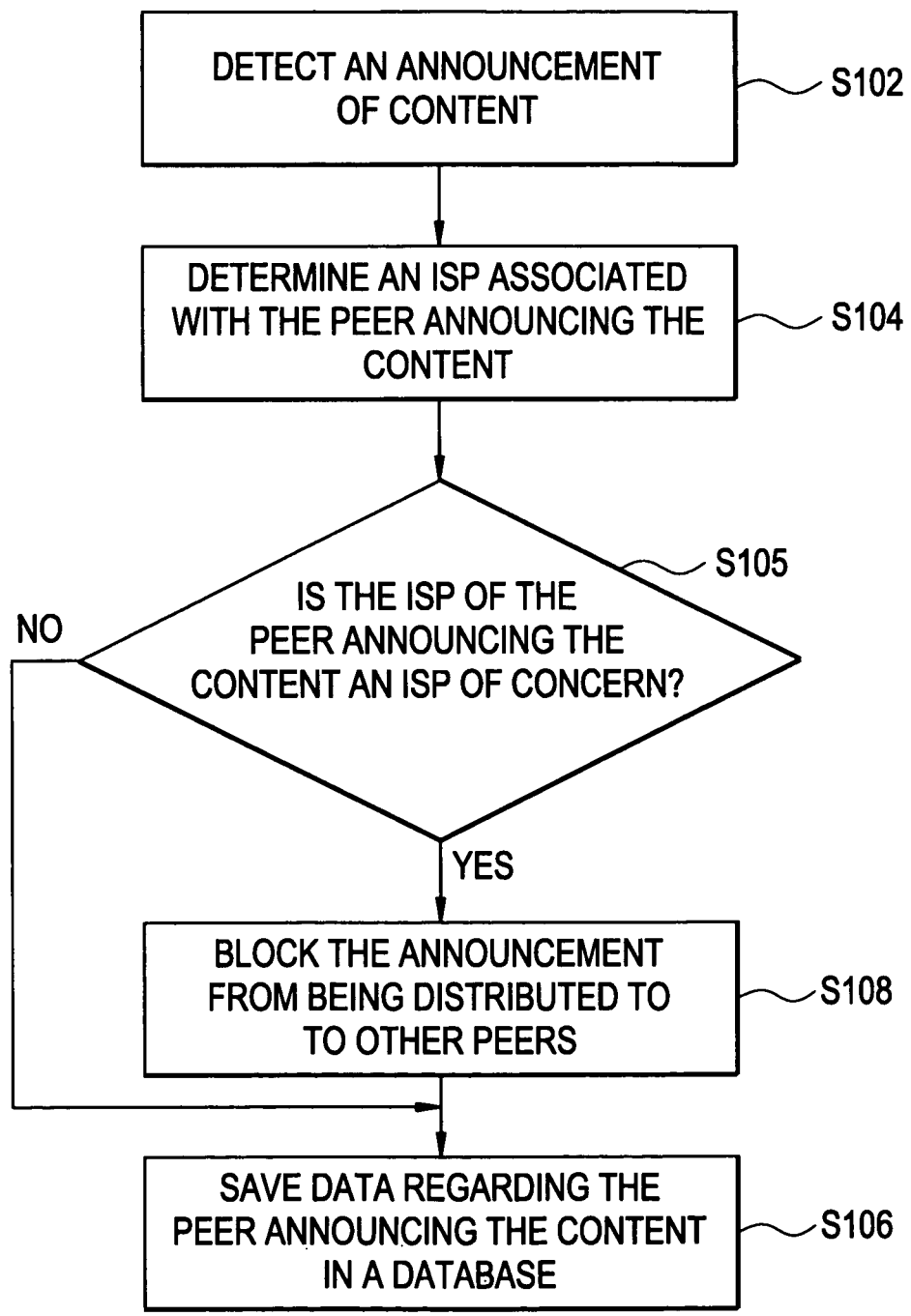
FIG. 4 illustrates a flow chart of a method for collecting peer information in a database in response to an announcement of content by a peer in a network according to an embodiment.

FIG. 4 illustrates a flow chart of the method for collecting peer information in a database according to an embodiment. At step S102, the network elements 45 detect an announcement of content made by peers 40, 42 or 44 associated with ISPs 24, 26 or the internet at large 44. Announcing content is well known in a peer-to-peer file sharing network. For example, a peer may be configured to periodically send a message to the network of the content that the peer contains and is willing to share. The information the peer may send may also include an ID or address of the peer.

One way the network elements 45 (See FIG. 3) may gather information and monitor the announcements and requests for content is through DPI of the messages regarding the peers having the requested content. In addition, the network operators could also use logical DPI. An example of logical DPI is explained in the following articles: Moritz Steiner, *Structures and Algorithms for Peer-to-Peer Cooperation, Doctoral thesis, Eurecom and University of Mannheim*, 2008, and Steiner, En-Najjary, and Biersack *Exploiting KAD: Possible Uses and Misuses, Computer Communication Review*, 37(5), October 2007, pages 65-69. These articles are incorporated herein by references in their entirety.

The logic DPI would permit the network elements 45 to see and intercept all messages in the DHT, independent of the way the sending or receiving clients (peers 40, 42, and 44) access the internet. The technique may allow the network elements 45 to localize traffic (by providing information for peers having preferred ISPs) for any ISP connected to the network without the need of the being physically present in the ISP having the traffic localized.

In step S104, an ISP with which the announcing peer is associated is determined. As mentioned above, an announcement of content will contain the ID or address of a peer. If the ID or address of peer is known, the ISP associated with that peer ID or address can easily be known. Searchable commercial databases are available that will indicate what ISP is associated with a given peer ID or address. Such a database 53 (as shown in FIG. 3) may be employed to detect what ISP is associated with a given peer.

Once the ISP of the announcing peer has been determined, the network elements 45 determine whether the ISP of the announcing peer is an ISP of concern at step S105. An ISP of concern is an ISP of particular interest to network operators. A ISP of concern may be selected by network operators. Network operators may select more than one ISP to be among ISPs of concern. For example, the network operators may want to reduce the use of certain links between various ISPs, bias traffic to stay with in particular ISPs, or to reduce traffic in or out of particular ISPs. An ISP in which network operator may want to manipulate traffic across may be considered an ISP of concern.

To determine whether an announcer is associated with an ISP of concern, the network elements may compare the identified ISP of the announcer with a list of ISP's of concern which may be stored in a separate database or determined by a set of rules programmed by network operators.

If the ISP of the announcing peer is not an ISP of concern, then the network elements 45 save data regarding the announcing peer in the database 52 at step S106. In step S106, information such as the peer's address, the content being announced and the ISP associated with the peer may be saved.

For example, the database 52 may be organized as shown below in Table 1. It should be understood that the description made here is made by way of example. The database could be organized by any number of different techniques in accordance with the invention.

TABLE 1

| Peer address | ISP associated with the Peer Address | Content associated with the Peer Address | Whether the ISP is an ISP of concern |
| --- | --- | --- | --- |

Each entry in the database may be associated with a different peer. The first field is the address associated with a peer. The next field lists the ISP associated with the peer address. If there is more than one ISP associated with a peer all of the ISP's may be listed. The next field lists the content associated with the peer address. There may be several different content items associated with a given peer. The content of the peer may be updated periodically. The peer information entry may include a last field indicating whether the ISP of the peer is an ISP of concern.

If the database 52 includes an entry for a peer as indicated by the peer address, the entry may be updated based on the announcement message. Otherwise, a new entry may be created.

If the network elements 45 determine that the ISP of the peer announcing content is an ISP of concern, than, at step S108 the network elements 45 block the announcement from being distributed to other peers. The blocking function can be conventionally done by the DPI hardware 60. In systems using logical DPI, one example way of blocking the announcement from being distributed to other peers is discussed in the article *Exploiting KAD: Possible Uses and Misuses* cited above. In addition to blocking the announcement of the content, if the ISP of the peer announcing the content is an ISP of concern, the network elements 45 will save information regarding the announcing peer at step S106 as described above.

Figure 5:
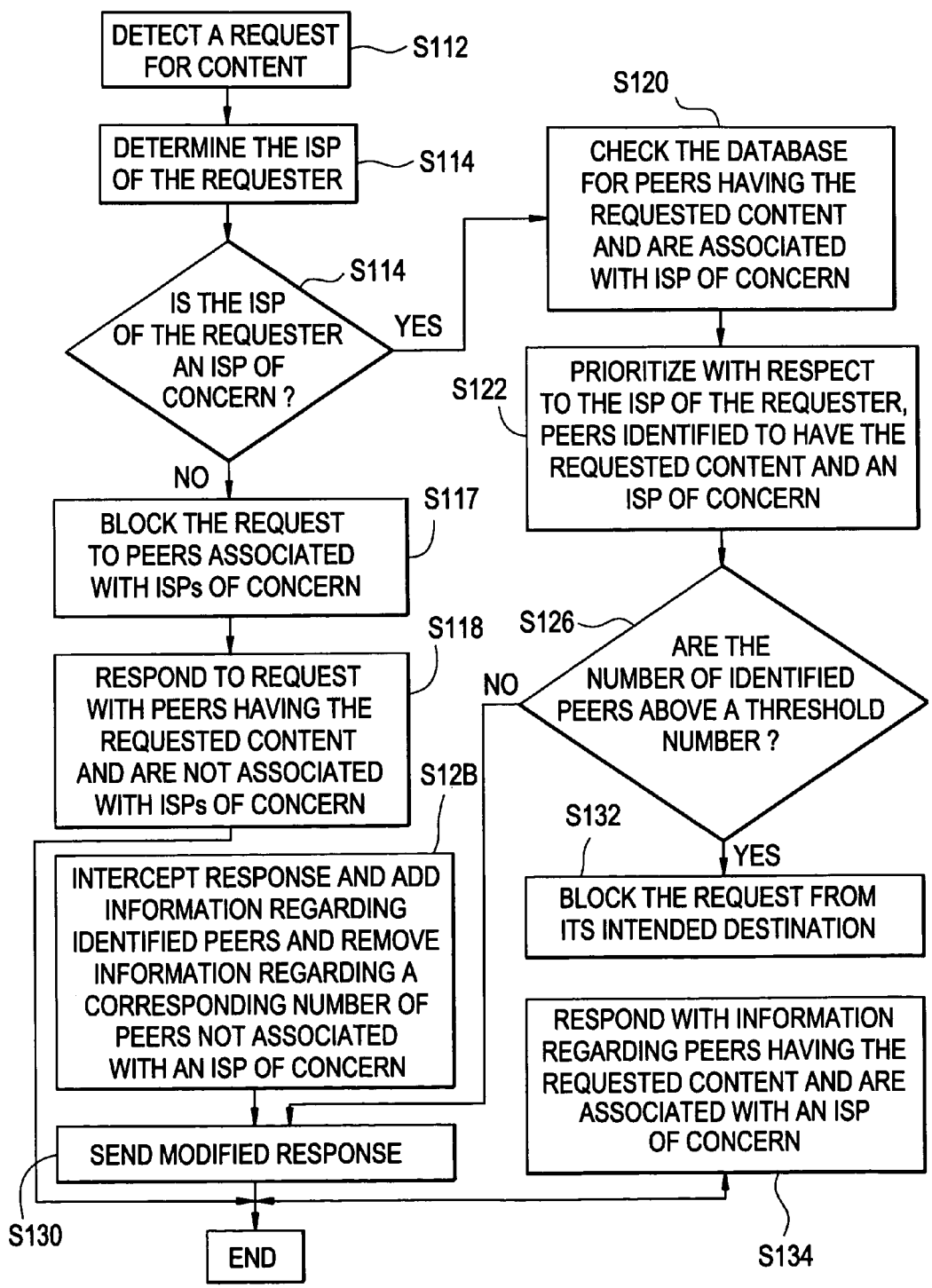
FIG. 5 illustrates a flow chart of a method of handling a request for content according to an embodiment.

FIG. 5 illustrates a flowchart of a method of handling a content request according to an embodiment. In step S112 network elements 45 monitor and detect a request for content from a peer on the network. Requesting content is well known in peer-to-peer file sharing networks using a DHT. For example, a requesting peer will send a request to another peer for content. If the receiving peer has the requested content, the receiving peer will update the request to indicate the receiving peer includes the content, and the receiving peer will forward updated the request on to another peer. If the receiving peer does not have the requested content, the receiving peer will forward the request on to another peer. The request may be forwarded until the request contains information regarding a specified number of peers. The specified number may be selected by the requester, network operator, or other entity. In current peer-to peer systems, this number is often 50. Once information regarding the specified number of peers has been reached, this information is sent back to the requester. The requester may then contact the peers directly for the requested content.

One way the request may be monitored is through DPI of the messages regarding the peers having the requested content. In addition, the network operators could also use logical DPI as described in the articles cited above. Once a request has been detected, a network element 45 in step S114, determines the ISP associated with the requesting peer. This may be done in a similar manner as determining the ISP associated with the announcing peer described at step S104 above.

Once the ISP associated with the requesting peer is identified, the network elements 45 may determine if the ISP of the requester is an ISP of concern at step S116. This may be accomplished in a similar manner as described above with respect to step S105 of FIG. 4.

If the requesting peer is not associated with an ISP of concern, then in step S117 the request is blocked from peers associated with a ISPs of concern. In systems using hardware 60 for DPI this blocking can be done conventionally or in any suitable manner by the hardware 60 at the edge of the ISP. In systems using logical DPI the request may be blocked as described in the articles cited above.

Where the ISP of the requester is not an ISP of concern, the network elements 45 may respond by searching the database 52 for peers having the requested content but are not associated with an ISP of concern. The network elements 45 then respond in step S118 to the request with information regarding peers that are not associated with ISPs of concern, if any are identified. The process then ends.

If the requesting peer is associated with an ISP of concern, then the network components or network elements 45 will search the database 52 for peers having the requested content and are associated with an ISP of concern in step S120.

Optionally, in step S122, the network elements 45 may prioritize the peers identified as having the requested content and are associated with and ISP of concern. A priority of the ISP may be determined by comparing the requesting peer's ISP with a desired order of priority. For example, the ISP associated with the requesting peer may be considered a first preferred ISP and then other ISPs may be given different levels of priority with respect to the requesting peer's ISP. For example, as shown in FIG. 2, if the requester is peer 40*d* then peers on the same ISP 24 would have a high priority. Peers on peer ISP 26 would have a lower priority. In other embodiments, a particular ISP may be given first priority regardless of the ISP associated with the requesting peer. The prioritization of ISPs may be set by system operator according the individual needs and requirements of the system operator.

Embodiments in accordance with the invention are not limited to one or two preferred ISPs, but may have a multitude of ISPs having various levels of priority depending upon costs, resources, usage, traffic or any other factors associated with links between ISPs or any other factor which may lead one ISP to be more preferred than another ISP. This priority information may be stored in the database or established through a set of rules.

In step S126, the number of peers identified as having the requested content and associated with an ISP of concern is considered. It may be desirable to identify multiple peers having the requested content to a requester in order for the requester to be able to select a peer from which to download content. Further, providing multiple peers will allow the requester to have fall back options in case the requester is not able to receive the requested content from a particular peer. In some embodiments, there may be a minimum threshold amount of peers to be identified in response to any one request. The minimum number of peers to be identified to a requester may be selected by the requestor, the ISP operator, or other system operator. In some embodiments, the minimum number of peers to be identified in a response is 50. The network element or computer 45 may only identify to the requester a number of peers meeting the threshold amount and no more.

The network element 45 may determine whether the amount of peers identified to have the requested content and associated with an ISP of concern meets or exceeds a threshold amount as shown in step S126. If the number of peers identified as having the requested content and associated with an ISP of concern is below the threshold amount, than the request is not blocked and will propagate according to typical peer-to-peer requests.

Once the request has circulated and has accumulated data regarding peers having the requested content in accordance with the number of peers needed to satisfy the request, a response including information regarding these peers will be sent to the requester. This response will be sent by a peer 44 on the internet at large 22 because the network elements 45 were not able to identify enough peers associated with an ISP of concern and have the requested content to satisfy the request. At step S128, the network elements 45 will intercept this response, modify the response, and to send the modified response. The response may be modified to add information regarding peers associated with an ISP of concern and having the requested content. Information regarding a corresponding number of peers 44 from the internet at large 22 (in other words not associated with an ISP of concern) will be removed from the response. Modifying the response will increase the probability that the requester will actually obtain the requested content from a peer associated with an ISP of concern. The modification of the response may be accomplished by the DPI hardware 60. In systems using logical DPI, the response may be modified as described in the articles cited above. This modified response is sent in step S130.

Returning to step S126, if the amount of peers having the requested content does exceed a threshold amount, then, at step S132, the network elements 45 will block the request from its intended destination. The request is blocked because the network elements 45 have enough information to respond to the request. The blocking can be accomplished by the DPI hardware 60. In systems using logical DPI, the request may be blocked as described in the cited articles.

In step S134, the network elements 45 will send only information regarding peers having the requested content and associated with an ISP of concern. In some embodiments no more peers than that numbering the threshold amount will be identified to the requestor. Because the identified peers were ordered by the established priority in step S122, identified peers having a lower priority may not be sent to the requestor if the number of the identified higher priority peers exceeds the threshold amount. This helps ensure that the peers that network operators would most like the requester to receive the requested content from are sent to the requester. Then the process ends.

Figure 6:
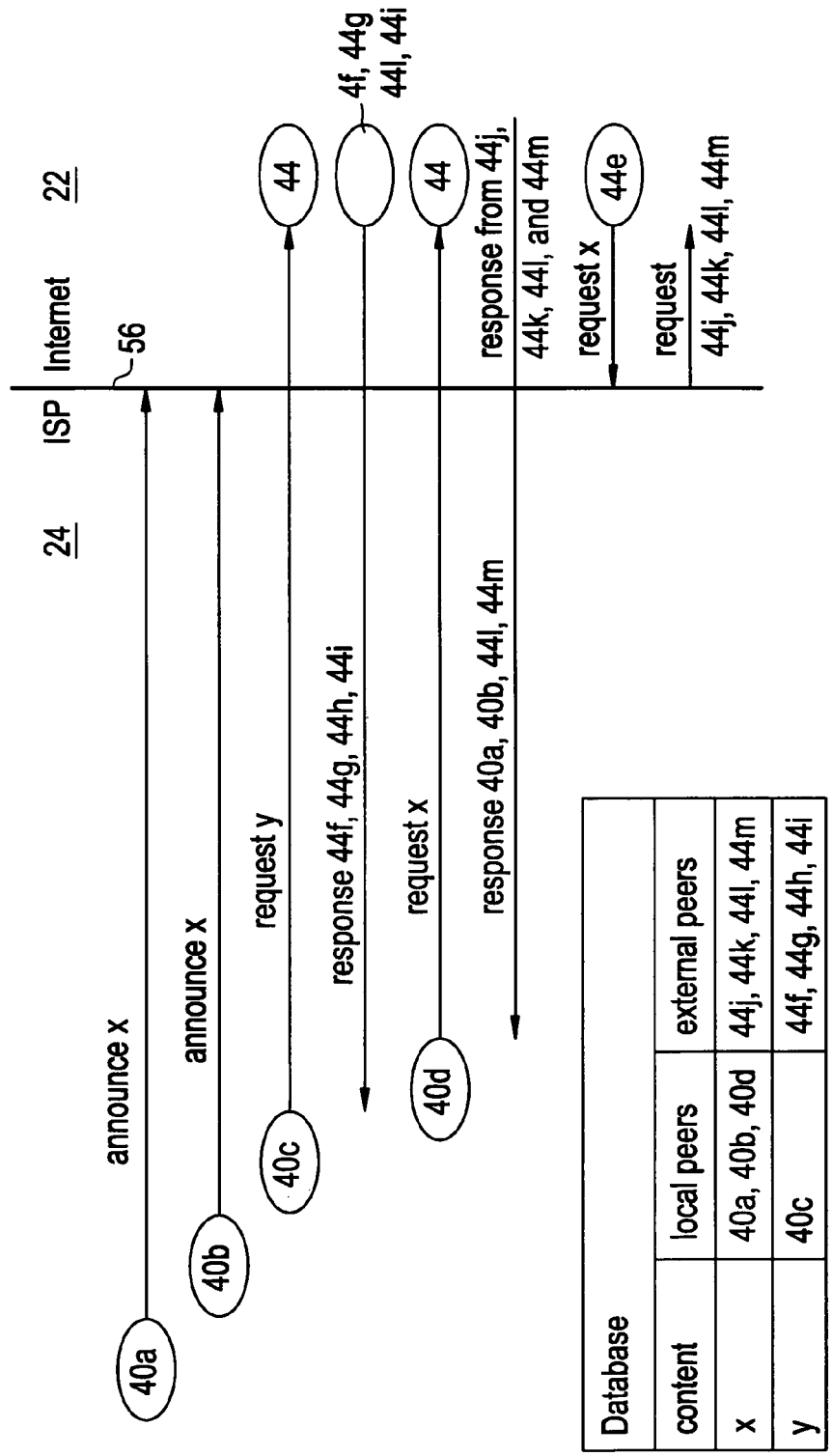
FIG. 6 is a schematic diagram representing announcements of content and requests by peers in a file sharing network.

FIG. 6 illustrates examples of how peers 40 and 44 may respond to (1) announcements of content by peers and (2) requests for content by peers in accordance with an embodiment of the invention. Network elements 45 (shown in FIG. 2) may perform a gate keeping function 56 and monitor all announcements of, or requests for content by any peer connected to the network 18. The network elements 45 may also determine what ISP or ISPs (if there is more than one) are associated with the announcing or requesting peer.

The more requests for content and the more announcements of content that are made, the database 52 will become increasingly full of data regarding what content the peers have announced they contain, and what ISPs those peers are associated with. As time goes on, the network elements 45 will become better at performing the gate keeping function 56.

For purposes of explanation, the following examples shown in FIG. 6 will be explained. The peers 40*a*, 40*b*, 40*c* and 40*d* are all located on ISP 24. ISP 24 is an ISP of concern. The internet at large 22 contains several peers 44, in particular peer 44*e*. The peers on the Internet at large 22 are not associated with an ISP of concern. Peers 40*a* and 40*b* announce that they have content x. The gate keeping function 56 performed by network elements 45 (shown in FIG. 3) block the announcement of content x to the internet at large 22.

The blocking of the announcement of content by peers 40*a* and 40*b* avoids peers 44 located on the internet at large 22 from knowing that peers 40*a* and 40*b* located on ISP 24 have the content x. Therefore, peer 44*e* will not request from peers 40*a* or 40*b* that the content x be sent via a transit link 30, (as shown in FIG. 2). Blocking the announcement of content x by peers 40*a* and 40*b* by the gate keeping function 56 can conserve usage of the transit link 30.

As shown in FIG. 6, peer 40*c* located on ISP 24 makes a request for content y. Because none of the peers 40 on ISP 24 contain the content y, the gate keeping function 56 allows the request for content y to pass to the Internet at large 22. Peers 44*f*, 44*g*, 44*h* and 44*i* (not shown) are identified to have the content y as in a conventional peer-to-peer system and the gate keeping function 56 permits information regarding peers 44*f*, 44*g*, 44*h*, and 44*i* to be sent to peer 40*c* in response to the request. Peer 40*c* then downloads the requested content from one or more of peers 44*f*, 44*g*, 44*h* and 44*i* via the transit link 30 (shown in FIG. 2).

In another example illustrated in FIG. 6, peer 40*d* requests the content x. As described above, peer 40*a* and 40*b* contain the content x. However, only two peers 40*a* and 40*b* located on ISP 24 have the content x. Two peers may be deemed not enough to reliably download the content or satisfy the request. (For the sake of the example shown in FIG. 6, the request is satisfied if information is available from four peers.

In other applications, a request would likely require information regarding many more peers than four.) Therefore, the gate keeping function 56 allows the request to pass to the internet at large 22. Peers 44*j*, 44*k*, 44*l*, and 44*m* are identified as having the requested content, and information is sent in response to the request for content x from peer 40*d* in accordance with a typical peer-to-peer network.

However, it may be desired to obtain the content x from a peer 40*a* or 40*b* of ISP 24 (the same ISP as the requesting peer 40*d*). Therefore the gate keeping function 56 modifies the response sent to the requesting peer 40*d*. The gate keeping function 56 removes two of the peers (in this case 44*j* and 44*k*) and replaces them with peers 40*a* and 40*b* identified to have the requested content and located within ISP 24 in order to increase the probability that peer 40*d* obtains its requested content x from a peer located within its own ISP 24.

However, had enough peers 40 located within the ISP 24 contained the content x then the gate keeping function 56 could have responded to the request for content x from peer 40*d* with information regarding only peers 40 located within the ISP 24.

In some embodiments in accordance with the invention, there may be a minimum threshold amount of peers to be identified in response to any one request. The minimum may be selected by the requestor, the ISP operator or other system operator. The gate keeping function 56 may populate the responses to the request for content with peers having the requested content and located within ISP 24 to identify the minimum threshold amount of peers until it runs out of peers 40 having the requested content on the ISP 24. At that point, the gate keeping function 56 may then draw upon the peers 44 having the requested content and located on the internet at large 22. Alternatively, once the gate keeping function 56 runs out of peers having the requested content on the ISP of the requester 40*c*, the gate keeping function 56 may then populate the response to the request with peers 42 having the requested content and an associated ISP 26 (as shown in FIG. 2).

As shown in FIG. 6, a peer 44*e* from the internet at large requests content x. Content x is contained on peers 40*a* and 40*b* but, the network elements 45 perform a gate keeping function 56 to block the request from peers 40 on the ISP of concern 24. The network elements 45 respond to the request from with a response that excludes peers 40 on the ISP of concern 24. The network elements 45 respond with information regarding peers not associated with the ISP of concern. In this case, the network elements 45 respond by providing information regarding peers 44*j*, 44*k*, 44*l*, and 44*m*.

The example embodiments being thus described, it will be obvious that the same may be varied in many ways. Such variations are not to be regarded as a departure from the disclosed subject matter, and all such modifications are intended to be included within the scope of the disclosed subject matter.

What is claimed is:

1. A method of processing peer-to-peer requests comprising:
    receiving an announce message from an announcing peer, the announce message containing an address of the announcing peer and content contained by the announcing peer;
    determining an internet service provider (ISP) associated with the address of the announcing peer using a first database, the first database associating addresses and internet service providers (ISPs);
    blocking an announcement of content by a peer associated with an ISP of concern;
    storing, at a network element, peer information in a second database, the peer information indicating the ISP associated with the announcing peer and the content contained by the announcing peer;
    receiving a request for content from a requester, the request for content including an address of the requester and content requested by the requester; determining an ISP associated with the address of the requester using the first database;
    formulating a response to the requester based on the determined ISP associated with the address of the requester, the content requested and a number of peers within the determined ISP that have the content requested as indicated by the second database; and
    sending the response to the requester.

2. The method of claim 1, wherein as part of the response, the network element identifies a peer to the requester, the identified peer being associated with an ISP that is a same ISP as an ISP that is associated with the requester, if such a peer is found to contain the requested content in the second database.

3. The method of claim 2, wherein as part of the response, the network element identifies to the requester a peer associated with an ISP that is a different ISP than the ISP associated with the requester and the ISP associated with the identified peer and the ISP associated the requester have a beneficial relationship, if such a peer is found to the contain the requested content in the second database and a number of identified peers having the same ISP as the ISP associated with the requester is below a threshold number.

4. The method of claim 1, wherein if two peers associated with different ISPs are identified, the peer having a same ISP as the requester will be identified to the requester.

5. The method of claim 1, wherein the sending a response step includes responding to a requester not associated with an ISP of concern with information regarding a peer that is not associated with an ISP of concern and includes the requested content.

6. The method of claim 1, wherein the sending a response step includes responding to a requester having an ISP of concern with information regarding a peer that is not associated with an ISP of concern and includes the requested content in addition to information regarding a peer associated with an ISP of concern and includes the requested content if a number of the peers associated with an ISP of concern and having the requested content is below a set threshold.

7. The method of claim 1, further comprising:
    monitoring an announcement from a peer regarding what content the announcing peer; and
    saving data regarding the announcing peer, the content, and an ISP of the announcing peer in the second database.

8. The method of claim 7, further comprising:
    monitoring a request from a peer regarding what content is requested and the ISP associated with the requesting peer.

9. The method of claim 8, wherein the responding step includes searching the second database for peers that have announced possession of the content requested.

10. The method of claim 8, wherein the monitoring an announcement from a peer step includes using deep packet inspection of the announcement.

11. The method of claim 8, wherein the monitoring a request from a peer step includes using deep packet inspection of the request.

12. The method of claim 7, wherein the monitoring an announcement from a peer step includes using logic deep packet inspection of the announcement.

13. The method of claim 7, wherein the monitoring step a request from a peer step includes using logic deep packet inspection of the request.

14. A computer comprising:
- a microprocessor;
- a first database operatively connected to the, first database associating addresses and Internet Service Providers (ISPs);
- a connection to the internet configured to operatively connect the microprocessor and the first database to the internet, wherein the computer is configured to,
- receive an announce message from an announcing peer, the announce message containing an address of the announcing peer and content contained by the announcing peer;
- determine an ISP associated with the address of the announcing peer using the first database;
- blocking an announcement of content by a peer associated with an ISP of concern;
- store peer information in a second database, the peer information indicating the at least one ISP associated with the announcing peer and the content contained by the announcing peer,
- receive a request for content from a requester, the request for content including an address of the requester and content requested by the requester, determine an ISP associated with the address of the requester using the first database;
- formulate a response to the requester based on the determined ISP associated with the address of the requester, the content requested and a number of peers within the determined ISP that have the content requested as indicated by the second database, and
- send the response to the requester.

15. A method of processing peer-to-peer requests comprising:
- detecting a request for content from a requester, the request including an address of the requester and the requested content;
- determining an internet service provider (ISP) associated with a the address of the requester using a first database, the first database associating addresses and internet service providers (ISPs);
- determining whether the ISP associated with the requester is an ISP of concern by accessing a second database, the second database indicating content available at an address, and whether the ISP associated with the address is of concern;
- determining which ISPs have the requested content and are not the ISP of concern by accessing the second database, if the ISP associated with the requester is not the ISP of concern;
- blocking the request to peers associated with an ISP of concern as indicated by the second database, if the ISP associated with the requester is not an ISP of concern; and
- responding to the request by sending information regarding peers having the requested content and that are not associated with an ISP of concern by accessing the second database, if the ISP associated with the requester is not an ISP of concern.

16. The method of claim 15, if the ISP associated with the requester is an ISP of concern than, further comprising:
- identifying peers in the second database having the requested content and are associated with an ISP of concern;
- determining if a number of peers identified in the identifying step is above a threshold number;
- blocking the request from an intended destination if the number of peers identified in the identifying step is above a threshold number; and
- responding with information regarding peers identified in the identifying step.

17. The method of claim 16, further comprising:
prioritizing peers identified in the identifying step.

18. The method of claim 17, further comprising:
sending information regarding the threshold number of highest priority peers identified in the identifying step if the number of peers identified in the identifying step exceeds the threshold number.

19. The method of claim 16, if the number of peers identified in the identifying step is below the threshold number than, further comprising:
- intercepting a response to the request;
- modifying the response by adding information regarding peers identified in the identifying step, and removing information from the response regarding peers not associated with an ISP of concern; and
- sending the modified response.

* * * * *